(12) United States Patent
Landacre

(10) Patent No.: US 12,104,704 B2
(45) Date of Patent: Oct. 1, 2024

(54) THREE-WAY VALVE

(71) Applicant: MAC Valves, Inc., Wixom, MI (US)

(72) Inventor: Brett Landacre, Bloomfield Hills, MI (US)

(73) Assignee: MAC Valves, Inc., Wixom, MI (US)

( * ) Notice: Subject to any disclaimer, the term of this patent is extended or adjusted under 35 U.S.C. 154(b) by 67 days.

(21) Appl. No.: 18/109,549

(22) Filed: Feb. 14, 2023

(65) Prior Publication Data

US 2024/0271709 A1   Aug. 15, 2024

(51) Int. Cl.
| | |
|---|---|
| F16K 31/06 | (2006.01) |
| F16K 3/02 | (2006.01) |
| F16K 3/18 | (2006.01) |
| F16K 11/044 | (2006.01) |
| F16K 11/065 | (2006.01) |
| F16K 27/02 | (2006.01) |
| F16K 27/04 | (2006.01) |
| F16K 1/12 | (2006.01) |

(52) U.S. Cl.
CPC ........ *F16K 11/0655* (2013.01); *F16K 3/0254* (2013.01); *F16K 3/0263* (2013.01); *F16K 3/029* (2013.01); *F16K 3/18* (2013.01); *F16K 11/044* (2013.01); *F16K 27/0263* (2013.01); *F16K 31/0617* (2013.01); *F16K 31/0627* (2013.01); *F16K 1/12* (2013.01); *F16K 27/048* (2013.01); *F16K 31/0613* (2013.01)

(58) Field of Classification Search
CPC .. F16K 11/044; F16K 27/0263; F16K 27/048; F16K 31/0613; F16K 31/0627
See application file for complete search history.

(56) References Cited

U.S. PATENT DOCUMENTS

| | | | | |
|---|---|---|---|---|
| 4,624,285 A * | 11/1986 | Perach | ................ | F16K 31/0627 251/129.05 |
| 6,116,276 A * | 9/2000 | Grill | ................... | F16K 31/0627 137/596.17 |
| 7,523,763 B2 * | 4/2009 | Katsuta | ............... | F16K 31/0627 251/282 |
| 9,052,023 B2 | 6/2015 | Janousek | | |
| 9,523,441 B2 * | 12/2016 | Abe | .................... | F16K 31/0627 |
| 2022/0403942 A1 | 12/2022 | Seeley | | |

FOREIGN PATENT DOCUMENTS

| | | |
|---|---|---|
| AU | 2021-290253 A1 | 7/2022 |
| CN | 112431932 A | 3/2021 |
| GB | 1016741 A | 1/1966 |

OTHER PUBLICATIONS

Extended European Search Report issued in EP 24153889.1, mailed Jul. 1, 2024.

* cited by examiner

*Primary Examiner* — Hailey K. Do
(74) *Attorney, Agent, or Firm* — Harness, Dickey & Pierce, P.L.C.

(57) ABSTRACT

A valve including a valve seat assembly that includes a first valve seat sealing member positioned between a first valve seat retaining ring and a first radially inwardly extending flange that extends from an inner surface of a hollow valve retainer, and a second valve seat sealing member positioned between a second valve seat retaining ring and a second radially inwardly extending flange that extends from the inner surface of the hollow valve retainer. A valve member is configured to engage and disengage with the first and second valve seat sealing members to permit fluid to travel from a fluid inlet to a fluid outlet.

15 Claims, 6 Drawing Sheets

THREE-WAY VALVE

FIELD

The present disclosure relates to a three-way valve.

BACKGROUND

This section provides background information related to the present disclosure which is not necessarily prior art.

Solenoid operated valves are frequently used in a variety of different applications, such as in sorters, packaging machines, food processors, and the like. These valves are used to control the flow of a fluid and may be operated for millions of cycles. Solenoid operated valves typically include a coil and an armature. The coil applies an electromagnetic force to the armature when electricity is supplied to the coil (i.e., when the solenoid is energized). A valve member moves between an open position and a closed position in response to movement of the armature. The valve has a valve seat, and the valve member has an abutment surface. The abutment surface of the valve member is spaced away from the valve seat of the valve body when the valve member is in the open position and contacts the valve seat of the valve body when the valve member is in the closed position. A biasing member, such as a spring, is used to oppose the electromagnetic force the coil applies to the armature. Depending on the arrangement of the solenoid operated valve, the biasing member may hold the valve member against the valve seat, which is commonly referred to as a normally closed valve, or away from the valve seat, which is commonly referred to as a normally open valve.

In order to provide a leak-proof seal, the abutment surface of the valve member is often formed of an elastomeric material. Typically, the valve member is made of a metal or plastic and the elastomeric material is over-molded or bonded to the metal or plastic of the valve member. In other configurations, the elastomeric material is secured to the valve member by an adhesive. The type of elastomeric material that is used in such valves is limited to materials that are suitable for bonding to the valve member or the adhesive. One drawback to such materials is that they are frequently more susceptible to degradation and/or corrosion when brought into contact with certain fluids. As a result, such valves are not well suited for applications where the fluid running through the solenoid operated valve is corrosive to the elastomeric material forming the abutment surface or corrosive to bonding agents or adhesives used to secure the elastomeric material to the valve member.

SUMMARY

This section provides a general summary of the disclosure, and is not a comprehensive disclosure of its full scope or all of its features.

According to a first aspect of the present disclosure there is provided a valve including a manifold having a cavity positioned between a fluid inlet and a fluid outlet; a valve assembly positioned within the cavity that selectively permits communication between the fluid inlet and the fluid outlet, the valve assembly including a hollow valve retainer having a first port that communicates with the fluid inlet, a second port that communicates with the fluid outlet, and a valve seat assembly between the first port and the second port, the hollow valve retainer housing a movable poppet including a valve member that is configured to engage and disengage with the valve seat assembly to permit fluid to travel from the fluid inlet through the first port to the second port, and then to the fluid outlet; and a solenoid assembly coupled to the valve assembly that is configured to actuate the valve assembly to permit the communication between the fluid inlet and the fluid outlet, the solenoid assembly including a movable armature engaged with the poppet, and a solenoid coil that is configured to move the armature and the poppet to permit the communication between the fluid inlet and the fluid outlet, wherein the valve seat assembly includes a first valve seat sealing member positioned between a first valve seat retaining ring and a first radially inwardly extending flange that extends from an inner surface of the hollow valve retainer and a second valve seat sealing member positioned between a second valve seat retaining ring and a second radially inwardly extending flange that extends from the inner surface of the hollow valve retainer, and wherein the valve member is configured to engage and disengage with the first and second valve seat sealing members to permit fluid to travel from the fluid inlet through the first port to the second port, and then to the fluid outlet.

According to the first aspect, the first and second valve seat sealing members are each formed of a perfluoroelastomer.

According to the first aspect, each of the first and second valve seat retaining rings are each hollow cylindrical members including an outer cylindrical surface, an inner cylindrical surface, a base annular surface that connects the outer cylindrical surface to the inner cylindrical surface, and a valve seat sealing member retaining surface, and the valve seat sealing member retaining surface is an arc-shaped surface that connects the outer cylindrical surface to the inner cylindrical surface.

According to the first aspect, the first valve seat sealing member is compressed between the first valve seat retaining ring and the first radially inwardly extending flange that extends from the inner surface of the hollow valve retainer, and the second valve seat sealing member is compressed between the second valve seat retaining ring and the second radially inwardly extending flange that extends from the inner surface of the hollow valve retainer.

According to the first aspect, the valve may further include a flexible diaphragm between the valve assembly and the solenoid assembly.

According to the first aspect, the manifold includes an exhaust in communication with the cavity.

According to the first aspect, the cavity includes a stepped profile when viewed in cross-section.

According to the first aspect, the stepped profile includes a first portion located proximate a first opening of the cavity, a second portion having a diameter less than first portion, a third portion having a diameter less than second portion, a fourth portion having a diameter less than third portion, and a fifth portion having a diameter less than fourth portion.

According to the first aspect, the hollow valve retainer includes a first section that is aligned with the second portion, a second section having an outer diameter that is less than that of the first section and that is aligned with the third portion, a third section having an outer diameter that is less than that of the second section and that is aligned with the fourth portion, and a fourth section having an outer diameter that is less than the third section and that is aligned with the fifth portion.

According to a second aspect of the present disclosure there is provided a valve that communicates with a fluid inlet and a fluid outlet, the valve includes a hollow valve retainer having a first port that is configured to communicate with the fluid inlet, a second port that that is configured to communicate with the fluid outlet, and a valve seat assembly between the first port and the second port, the hollow valve retainer housing a movable poppet including a valve member that is configured is engage and disengage with the valve seat assembly to permit fluid to travel from the fluid inlet through the first port to the second port, and then to the fluid outlet; and an actuator assembly that is configured to actuate the movable poppet to permit the communication between the fluid inlet and the fluid outlet, the actuator assembly including a movable armature engaged with the poppet, wherein the valve seat assembly includes a first valve seat sealing member positioned between a first valve seat retaining ring and a first radially inwardly extending flange that extends from an inner surface of the hollow valve retainer and a second valve seat sealing member positioned between a second valve seat retaining ring and a second radially inwardly extending flange that extends from the inner surface of the hollow valve retainer, and wherein the valve member is configured to engage and disengage with the first and second valve seat sealing members to permit fluid to travel from the fluid inlet through the first port to the second port, and then to the fluid outlet.

According to the second aspect, the first and second valve seat sealing members are each formed of a perfluoroelastomer.

According to the second aspect, each of the first and second valve seat retaining rings are each hollow cylindrical members including an outer cylindrical surface, an inner cylindrical surface, a base annular surface that connects the outer cylindrical surface to the inner cylindrical surface, and a valve seat sealing member retaining surface, and the valve seat sealing member retaining surface is an arc-shaped surface that connects the outer cylindrical surface to the inner cylindrical surface.

According to the second aspect, the first valve seat sealing member is compressed between the first valve seat retaining ring and the first radially inwardly extending flange that extends from the inner surface of the hollow valve retainer, and the second valve seat sealing member is compressed between the second valve seat retaining ring and the second radially inwardly extending flange that extends from the inner surface of the hollow valve retainer.

According to the second aspect, the valve may include a flexible diaphragm between the hollow valve retainer and the actuator assembly.

According to the second aspect, the actuator assembly includes a solenoid having a solenoid coil that is configured to move the armature and the poppet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
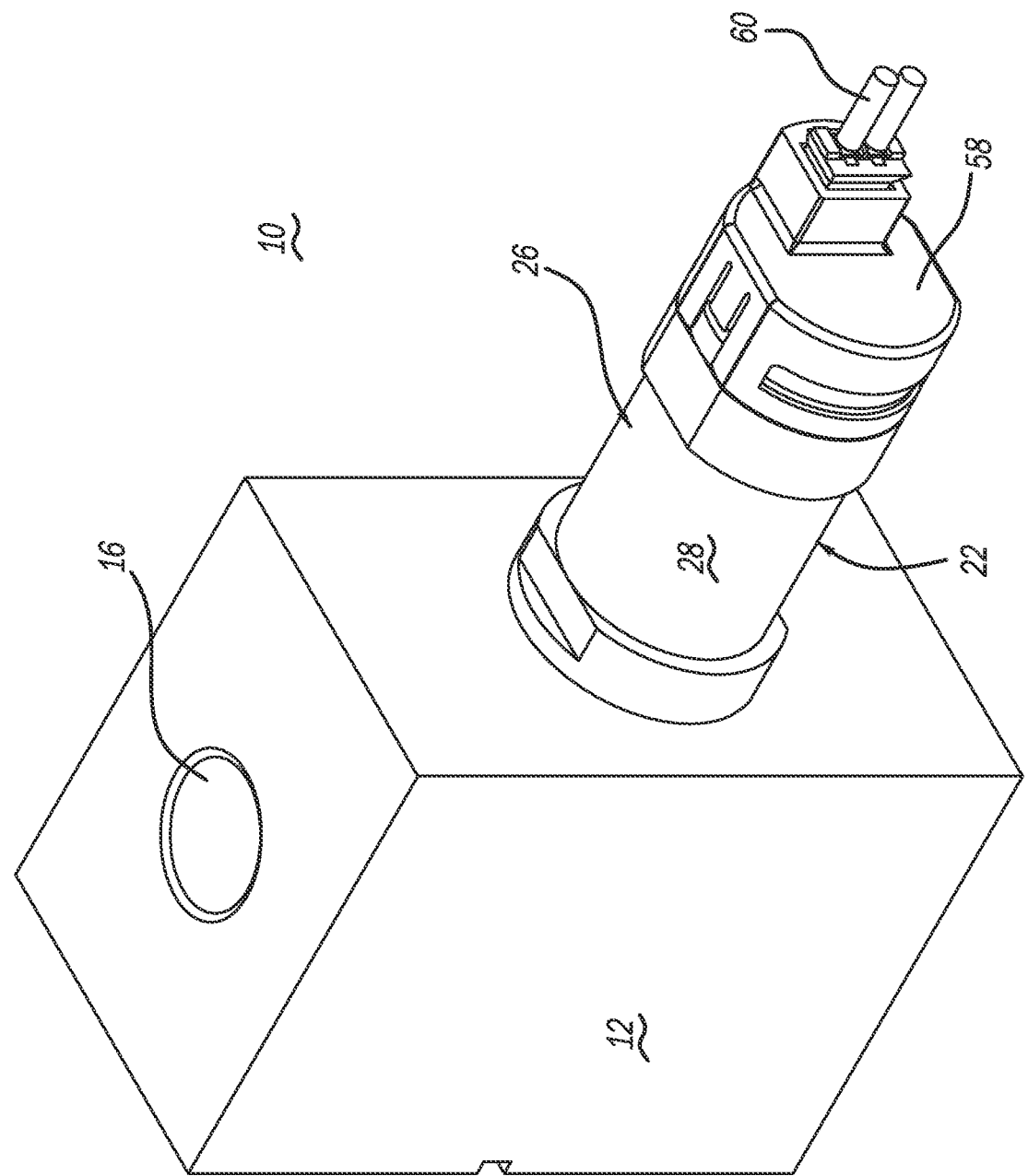
FIG. 1 is a perspective view of a valve according to a principle of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1 to 5 illustrate a valve apparatus 10 according to a principle of the present disclosure. Valve apparatus 10 is configured to control the flow of fluid, including liquids and gases. Valve apparatus 10 includes a manifold or ported cavity block 12 (FIGS. 1-4). Cavity block 12 is generally a cubic or rectangular structure having an inlet 14, an outlet 16, and an exhaust 18. It should be understood, however, that outlet 16 may function as an inlet and each of inlet 14 and exhaust 18 may function as outlets. In addition, it should be understood that exhaust 18 may function as a second inlet if valve apparatus 10 is used to permit two different fluids (i.e., two different liquids, two different gases, or one liquid and one gas) to flow through valve apparatus 10.

Figure 2:
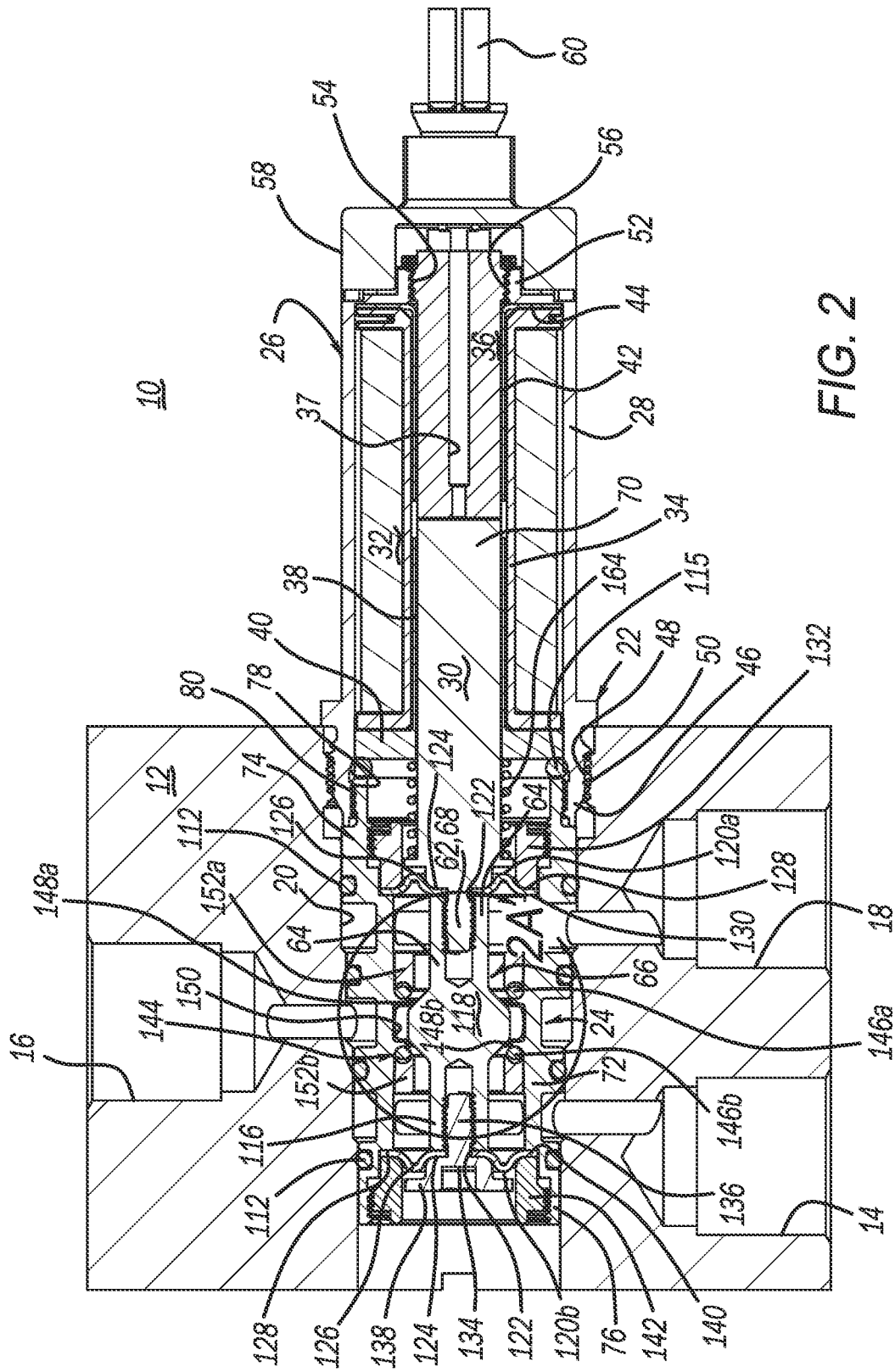
FIG. 2 is a cross-sectional view of the valve illustrated in FIG. 1.

Cavity block 12 includes a cavity 20 in communication with each of inlet 14, outlet 16, and exhaust 18. Cavity 20 is configured for receipt of a valve cartridge 22, which is best shown in FIGS. 1 and 2. Valve cartridge 22 includes a valve assembly 24 that is opened and closed by an actuation assembly 26. In the illustrated embodiment, actuation assembly 26 is a solenoid actuator. Although a solenoid actuator is shown and described, it should be understood that other actuators known to one skilled in the art (e.g., stepper motors) may be used in place of the solenoid actuator without departing from the scope of the present disclosure. In the illustrated embodiment (see, e.g., FIG. 2), actuation assembly 26 includes a housing 28, an armature 30, a solenoid coil 32 that is mounted to a hollow cylindrical support structure 34, and a pole piece 36. A first cylindrical sleeve 38 including a first radially outwardly extending flange 40 may be positioned between support structure 34 and armature 30, and a second cylindrical sleeve 42 having a second radially outwardly extending flange 44 may be positioned between support structure 34 and pole piece 36.

Housing 28 is a hollow cylindrical member including a first end 46 having a threaded surface 48 that is configured to threadingly engage with a correspondingly threaded surface 50 formed in cavity 20. Housing 28 also includes a second end 52 having a threaded surface 54 configured to threadingly engage with a threaded surface 56 formed on pole piece 36, which fixes pole piece 36 to housing 28. While pole piece 36 is illustrated as having a central axially extending aperture 37, pole piece 36 is not required to have this feature. A cover piece 58 designed as a plug and including electrical connections 60 that are configured to supply a current or voltage to solenoid coil 32 may be attached to second end 52 of housing.

Armature 30 is a solid member formed of a material that can be magnetically attracted, and includes a mating end 62 that is configured to mate with a first internally threaded end 64 of a poppet 66 of valve assembly 24. Mating end 62 includes a threaded projection 68 connected to a main body 70 of armature 30. Internally threaded end 64 of poppet 66 is configured for receipt of the threaded projection 68. Armature 30 is movable such that when a voltage or current is applied to solenoid assembly 26, armature 30 can move poppet 66 between the open and closed positions.

Figure 4:
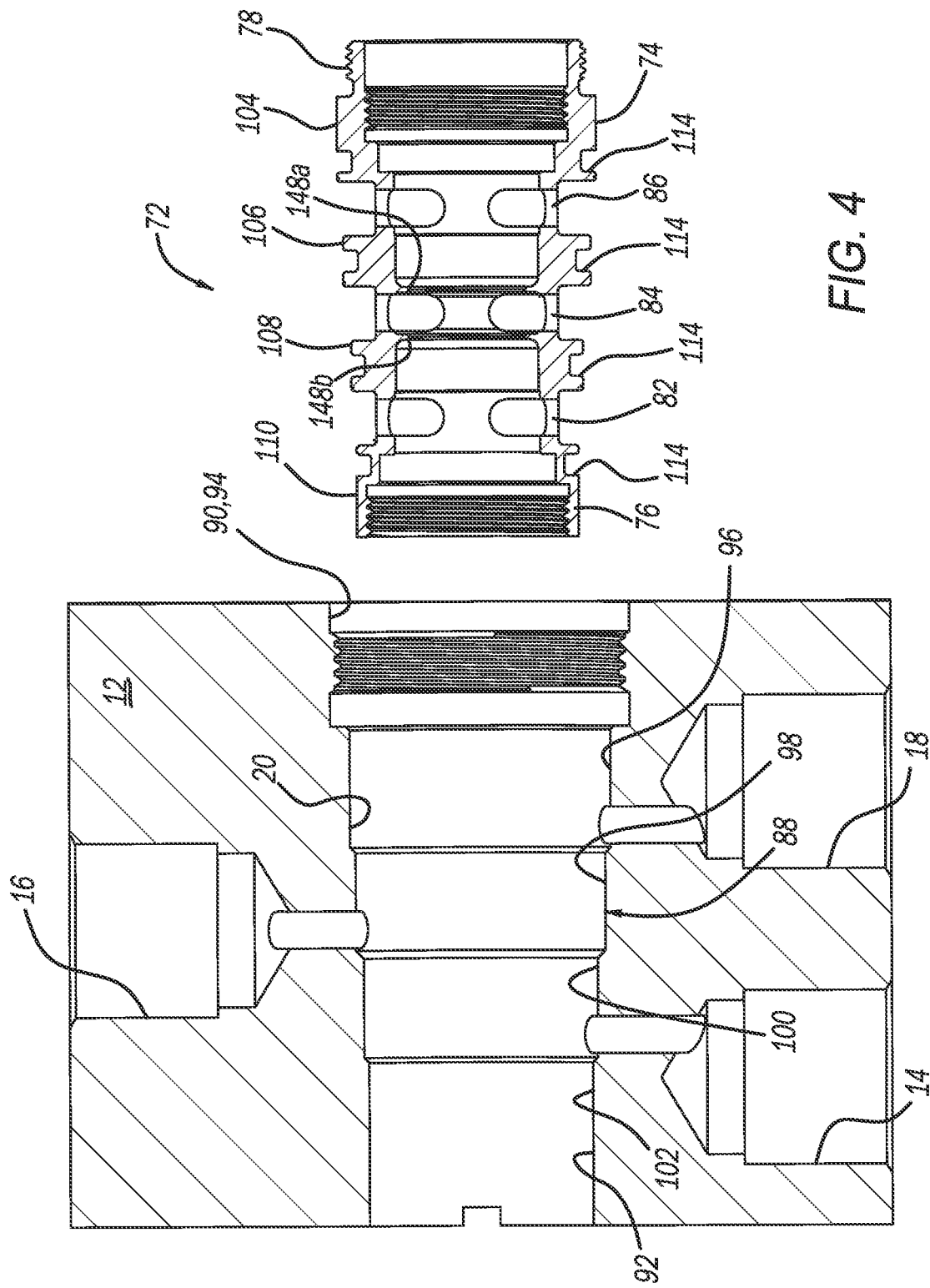
FIG. 4 is a cross-sectional view of a manifold and valve retainer of the valve illustrated in FIG. 1.

Valve assembly 24 is seated within cavity 20 of cavity block 12. Valve assembly 24 includes a valve retainer 72 including a proximal end 74 coupled to housing 28 of solenoid assembly 26, and a distal end 76 located within cavity 20. Proximal end 74 includes an exterior threading 78 that is configured to mate with an interior threaded surface 80 formed on first end 46 of housing 28. As best shown in FIG. 4, valve retainer 72 includes a first plurality of ports 82, a second plurality of ports 84, and a third plurality of ports 86. When valve assembly 24 is seated within cavity 20, the first plurality of ports 82 are positioned in alignment with inlet 14 of cavity block 12, the second plurality of ports 84 are positioned in alignment with outlet 16 of cavity block 12, and the third plurality of ports 86 are positioned in alignment with exhaust 18.

In addition, as best shown in FIG. 4, it can be seen that cavity 20 has a stepped profile 88 such that a first opening 90 of cavity 20 has a diameter that is greater than a diameter of a second opening 92 of cavity 20. More particularly, stepped profile 88 includes a first portion 94 located proximate first opening 90, a second portion 96 having a diameter less than first portion 94, a third portion 98 having a diameter less than second portion 96, a fourth portion 100 having a diameter less than third portion 98, and a fifth portion 102 having a diameter less than fourth portion 100.

Similarly, valve retainer 72 includes a first section 104 that is aligned with second portion 96, a second section 106 having an outer diameter that is less than that of first section 104 and that is aligned with third portion 98, a third section 108 having an outer diameter that is less than that of second section 106 and that is aligned with fourth portion 100, and a fourth section 110 having an outer diameter that is less than third section 108 and that is aligned with fifth portion 102. A plurality of seal members 112 (see, e.g., FIG. 2) are located in recesses 114 formed in valve retainer 72, with the seal members 112 sealing the interfaces between the various sections 104-110 of valve retainer 72 and the various portions 94-102. In addition, a seal member 115 may be located between proximate end 74 and flange 40 of sleeve 38 to seal an interface between valve retainer 72 and actuator assembly 26.

Valve retainer 72 houses poppet 66 that, as noted above, is coupled to armature 30. Poppet 66 includes first internally threaded end 64 and an opposite second internally threaded end 116. A valve member 118 is positioned between first internally threaded end 64 and second internally threaded end 116. Movement of poppet 66 by actuation of armature 30 moves valve member 118 between the open and closed positions.

Valve assembly 24 includes a pair of diaphragms 120a and 120b that are configured to seal valve assembly 24. In this regard, diaphragm 120a is located between armature 30 and first internally threaded end 64 of poppet 66. Diaphragm 120a includes a centrally positioned aperture 122 that is configured to for receipt of threaded projection 68 such that when armature 30 is threadingly engaged with first internally threaded end 64 of poppet, a central portion 124 of diaphragm 120a is sandwiched between poppet 66 and armature 30. Diaphragm 120a also includes an annular ridge 126 positioned radially outward from centrally positioned aperture 122 that permits diaphragm 120a to flex during use of valve assembly 24, which assists in attenuating pressure fluctuations experienced by valve assembly 24 during use thereof. A radially outermost portion 128 of diaphragm 120*a* is sandwiched between a first radially inwardly extending shoulder 130 of valve retainer 72, and a first retainer ring 132 that is threadingly engaged with valve retainer 72.

Second diaphragm 120*b* is similar to first diaphragm 120*a*, and is located between a fastener 134 and second internally threaded end 116 of poppet 66. Fastener 134 includes a threaded shank 136 configured to mate with second internally threaded end 116 of poppet, and a head 138 that extends radially outward from threaded shank 136. A centrally positioned aperture 122 of second diaphragm 120*b* is configured for receipt of threaded shank 136 such that when fastener 134 is threadingly engaged with second internally threaded end 116 of poppet 66, a central portion 124 of second diaphragm 120*b* is sandwiched between poppet 66 and fastener 134. Diaphragm 120*b* also includes an annular ridge 126 positioned radially outward from centrally positioned aperture 122 that permits diaphragm 120*b* to flex during use of valve assembly 24, which assists in attenuating pressure fluctuations experienced by valve assembly 24 during use thereof. A radially outermost portion 128 of diaphragm 120*b* is sandwiched between a second radially inwardly extending shoulder 140 of valve retainer 72, and a second retainer ring 142 that is threadingly engaged with valve retainer 72 and is similar to first retainer ring 132.

Figure 2A:
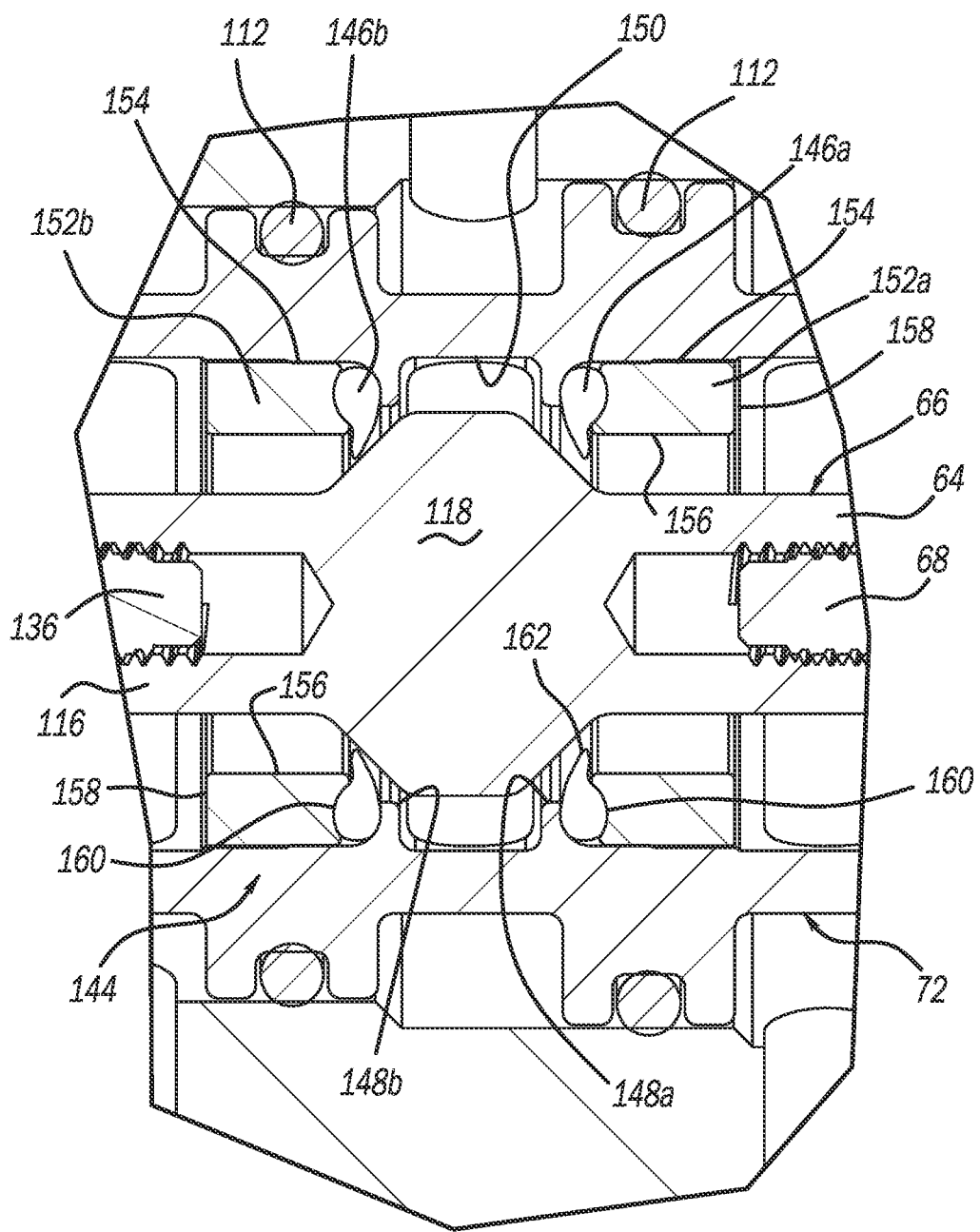
FIG. 2A is an enlarged cross-sectional view of a portion of FIG. 2.
Figure 3:
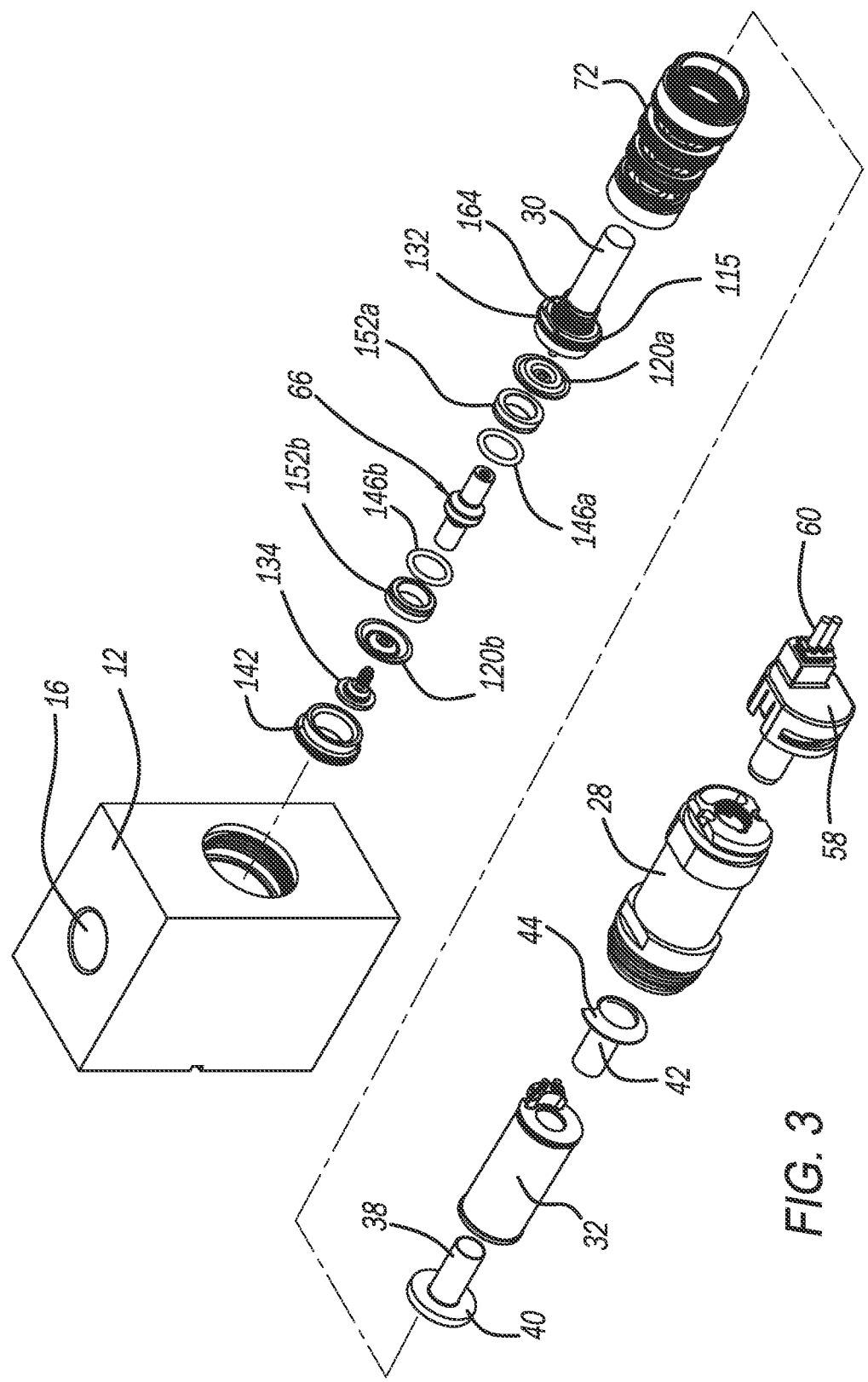
FIG. 3 is an exploded perspective view of the valve illustrated in FIGS. 1 and 2.

Valve assembly 24 includes a valve seat assembly 144 that is configured to be contacted by valve member 118 to open and close valve assembly 24. As best shown in FIGS. 2 and 2A, valve seat assembly 144 includes a pair of valve seat sealing members 146 positioned on opposing sides of valve member 118.

A first valve seat sealing member 146*a* is positioned between a first radially inwardly extending flange 148*a* that extends from an inner surface 150 of valve retainer 72 and a first valve seat sealing member retaining ring 152*a*, and second valve seat sealing member 146*b* is positioned between a second radially inwardly extending flange 148*b* that extends from inner surface 150 of valve retainer 72 and a second valve seat sealing member retaining ring 152*b*. During operation of valve assembly 24, valve member 118 will seat against first valve seat sealing member 146*a* when valve assembly 24 is in the open position, and seat against second valve seat sealing member 146*b* when valve assembly 24 is in the closed position.

In the illustrated embodiment, first and second valve seat sealing members 146*a* and 146*b* may be O-rings that may be formed of a material such as a perfluoroelastomer, which is an elastomer of polytetrafluoroethylene (PTFE). An example perfluoroelastomer is FFKM sold under the tradename Keyflon™ Such a material is advantageous in applications where the fluid passing through valve may be chemically aggressive (e.g., corrosive). Put another way, such a material is more chemically resistant to materials such as acetone and aldehyde, and such a material also has greater resistance to higher temperatures. While materials such as perfluoroelastomers may be preferable, the present disclosure should not be limited thereto. First and second valve seat sealing members 146*a* and 146*b* may be formed of any elastomeric material known to one skilled in the art, and may be selected based on factors such as its compatibility with the fluids that are selected to pass through valve assembly 24, and its ability to compress (i.e., hardness).

Figure 5:
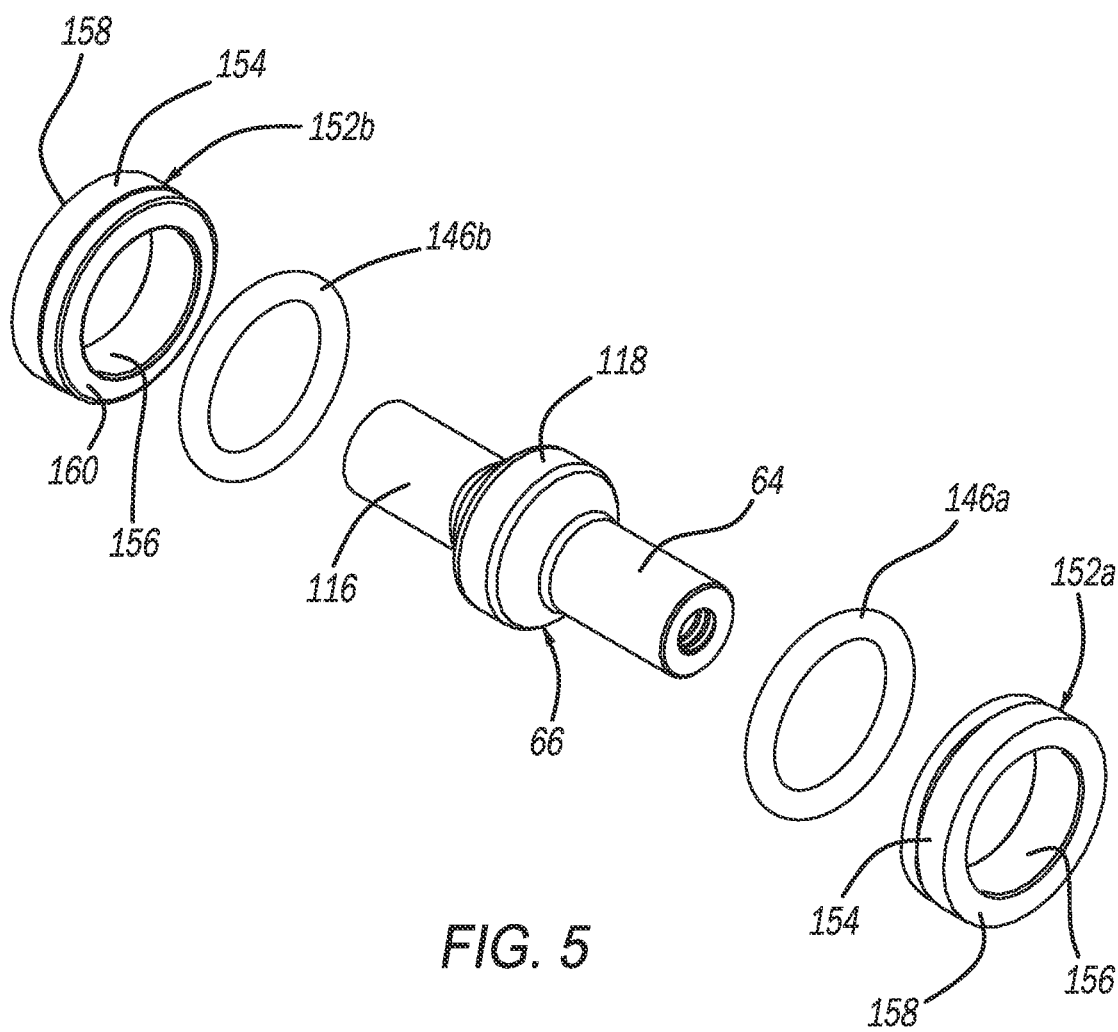
FIG. 5 is an exploded perspective view of a valve seat assembly according to a principle of the present disclosure.

As best shown in FIGS. 2A and 5, first and second valve seat sealing member retaining rings 152*a* and 152*b* are each hollow cylindrical members including an outer cylindrical surface 154, an inner cylindrical surface 156, a base annular surface 158 that connects outer cylindrical surface 154 to inner cylindrical surface 156, and a valve seat sealing member retaining surface 160. As can be seen in the illustrated embodiment, valve seat sealing member retaining surface 160 is an arc-shaped surface that connects outer cylindrical surface 154 to inner cylindrical surface 156, and has a radius of curvature that is similar to the round cross-sectional shape of the first and second valve seat sealing members 146*a*, 146*b*. Put another way, valve seat sealing member retaining surface 160 is configured for receipt of one of the valve seat sealing members 146*a*, 146*b*.

As best shown in FIG. 2A, the first and second valve seat sealing members 146*a*, 146*b* may respectively be compressed between the first and second valve seat sealing member retaining rings 152*a* and 152*b* and the first radially inwardly extending flanges 148*a*, 148*b*. When compressed in this manner, the first and second valve seat sealing members 146*a*, 146*b* may have a cross-sectional shape in the form of a comma (,) and valve member 118 may seat against a tail end 162 of the compressed valve seat sealing members 146*a*, 146*b*. It should be understood, however, that first and second valve seat sealing members 146*a*, 146*b* do not necessarily need to be compressed to such an extent. That is, it is only necessary that the first and second valve seat sealing members 146*a* and 146*b* be compressed to an extent that the sealing members 146*a*, 146*b* remain fixed at the desired location and at higher pressures for abutment with valve member 118. Compression of the first and second valve seat sealing members 146*a* and 146*b* in this manner also assists in the valve assembly 24 maintaining a balanced design.

Moreover, compression of first and second valve seat sealing members 146*a*, 146*b* between the first and second valve seat sealing member retaining rings 152*a* and 152*b* and the first radially inwardly extending flanges 148*a*, 148*b* provides a configuration that does not require an adhesive to fix the first and second valve seat sealing members 146*a*, 146*b* at the desired locations. This, in turn, also permits valve seat sealing members 146*a*, 146*b* to be formed of the above-noted perfluoroelastomer, and provides a configuration where valve member 118 does not require an overmolded coating or layer of elastomeric material. Accordingly, the valve 10 according to the present disclosure is well suited for applications where the fluid running through the valve may be corrosive.

Upon application of a current or voltage to coil 32, pole piece 36 is magnetized such that pole piece 36 can magnetically attract armature 30. As armature 30 is pulled toward pole piece 36, armature 30 will pull poppet 66 toward pole piece 36 and a spring 164 (see, e.g., FIG. 2) configured to bias armature 30 and poppet 66 to the closed position of the valve 10 that is located between flange 40 of sleeve 38 and armature 30 will be compressed. As poppet 66 is pulled toward pole piece 36, valve member 118 will be disengaged from second valve seat sealing member 146*b* and placed into engagement with first valve seat sealing member 146*a* to open valve assembly 24. Opening valve assembly 24 permits fluid to travel from inlet 14 through first ports 82, past valve member 118, and through second ports 84 into outlet 16. In this state, the flow of fluid is prevented from exiting block 12 through exhaust 18.

To close the valve assembly 24, application of the current or voltage to coil 32 is stopped at which time spring 164 can bias armature 30 and poppet 118 in a direction away from pole piece 36. Valve member 118 of poppet 66 then reengages with second valve seat sealing member 146b to close the valve assembly 24 (i.e., prevent fluid from exiting block 12 through outlet 16). Any fluid remaining in valve assembly 24 after valve member 118 reengages with second valve seat sealing member 146b may then exit block 12 through exhaust 18. Even if the functions of inlet 14 and outlet 16 are reversed, valve assembly 24 may operate in the same manner.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve comprising:
   a manifold having a cavity positioned between a fluid inlet and a fluid outlet;
   a valve assembly positioned within the cavity that selectively permits communication between the fluid inlet and the fluid outlet, the valve assembly including a hollow valve retainer having a first port that communicates with the fluid inlet, a second port that communicates with the fluid outlet, and a valve seat assembly between the first port and the second port, the hollow valve retainer housing a movable poppet including a valve member that is configured is engage and disengage with the valve seat assembly to permit fluid to travel from the fluid inlet through the first port to the second port, and then to the fluid outlet; and
   a solenoid assembly coupled to the valve assembly that is configured to actuate the valve assembly to permit the communication between the fluid inlet and the fluid outlet, the solenoid assembly including a movable armature engaged with the movable poppet, and a solenoid coil that is configured to move the movable armature and the movable poppet to permit the communication between the fluid inlet and the fluid outlet,
   wherein the valve seat assembly includes a first valve seat sealing member positioned between a first valve seat retaining ring and a first radially inwardly extending flange that extends from an inner surface of the hollow valve retainer and a second valve seat sealing member positioned between a second valve seat retaining ring and a second radially inwardly extending flange that extends from the inner surface of the hollow valve retainer, and
   wherein the valve member is configured to engage and disengage with the first and second valve seat sealing members to permit fluid to travel from the fluid inlet through the first port to the second port, and then to the fluid outlet.

2. The valve according to claim 1, further comprising a flexible diaphragm between the valve assembly and the solenoid assembly.

3. The valve assembly according to claim 1, wherein the manifold includes an exhaust in communication with the cavity.

4. The valve according to claim 1, wherein the first and second valve seat sealing members are each formed of a perfluoroelastomer.

5. The valve according to claim 1, wherein each of the first and second valve seat retaining rings are each hollow cylindrical members including an outer cylindrical surface, an inner cylindrical surface, a base annular surface that connects the outer cylindrical surface to the inner cylindrical surface, and a valve seat sealing member retaining surface, and the valve seat sealing member retaining surface is an arc-shaped surface that connects the outer cylindrical surface to the inner cylindrical surface.

6. The valve according to claim 5, wherein the first valve seat sealing member is compressed between the first valve seat retaining ring and the first radially inwardly extending flange that extends from the inner surface of the hollow valve retainer, and the second valve seat sealing member is compressed between the second valve seat retaining ring and the second radially inwardly extending flange that extends from the inner surface of the hollow valve retainer.

7. The valve assembly according to claim 1, wherein the cavity includes a stepped profile when viewed in cross-section.

8. The valve assembly according to claim 7, wherein the stepped profile includes a first portion located proximate a first opening of the cavity, a second portion having a diameter less than first portion, a third portion having a diameter less than second portion, a fourth portion having a diameter less than third portion, and a fifth portion having a diameter less than fourth portion.

9. The valve assembly according to claim 8, wherein the hollow valve retainer includes a first section that is aligned with the second portion, a second section having an outer diameter that is less than that of the first section and that is aligned with the third portion, a third section having an outer diameter that is less than that of the second section and that is aligned with the fourth portion, and a fourth section having an outer diameter that is less than the third section and that is aligned with the fifth portion.

10. A valve that communicates with a fluid inlet and a fluid outlet, the valve comprising:
    a hollow valve retainer having a first port that is configured to communicate with the fluid inlet, a second port that that is configured to communicate with the fluid outlet, and a valve seat assembly between the first port and the second port, the hollow valve retainer housing a movable poppet including a valve member that is configured to engage and disengage with the valve seat assembly to permit fluid to travel from the fluid inlet through the first port to the second port, and then to the fluid outlet; and
    an actuator assembly that is configured to actuate the movable poppet to permit the communication between the fluid inlet and the fluid outlet, the actuator assembly including a movable armature engaged with the movable poppet,
    wherein the valve seat assembly includes a first valve seat sealing member positioned between a first valve seat retaining ring and a first radially inwardly extending flange that extends from an inner surface of the hollow valve retainer and a second valve seat sealing member positioned between a second valve seat retaining ring and a second radially inwardly extending flange that extends from the inner surface of the hollow valve retainer, and
    wherein the valve member is configured to engage and disengage with the first and second valve seat sealing members to permit fluid to travel from the fluid inlet through the first port to the second port, and then to the fluid outlet.

11. The valve according to claim 10, wherein the first and second valve seat sealing members are each formed of a perfluoroelastomer.

12. The valve according to claim 10, further comprising a flexible diaphragm between the hollow valve retainer and the actuator assembly.

13. The valve assembly according to claim 10, wherein the actuator assembly includes a solenoid having a solenoid coil that is configured to move the movable armature and the movable poppet.

14. The valve according to claim 10, wherein each of the first and second valve seat retaining rings are each hollow cylindrical members including an outer cylindrical surface, an inner cylindrical surface, a base annular surface that connects the outer cylindrical surface to the inner cylindrical surface, and a valve seat sealing member retaining surface, and the valve seat sealing member retaining surface is an arc-shaped surface that connects the outer cylindrical surface to the inner cylindrical surface.

15. The valve according to claim 14, wherein the first valve seat sealing member is compressed between the first valve seat retaining ring and the first radially inwardly extending flange that extends from the inner surface of the hollow valve retainer, and the second valve seat sealing member is compressed between the second valve seat retaining ring and the second radially inwardly extending flange that extends from the inner surface of the hollow valve retainer.

\* \* \* \* \*